July 19, 1955 W. G. SECK 2,713,381

METHOD OF MAKING FLEXIBLE HOSE

Filed Feb. 6, 1953 3 Sheets-Sheet 1

INVENTOR.
Werner G. Seck
BY
ATTORNEY.

July 19, 1955  W. G. SECK  2,713,381

METHOD OF MAKING FLEXIBLE HOSE

Filed Feb. 6, 1953  3 Sheets-Sheet 2

INVENTOR.
Werner G. Seck
BY
ATTORNEY.

July 19, 1955   W. G. SECK   2,713,381
METHOD OF MAKING FLEXIBLE HOSE
Filed Feb. 6, 1953   3 Sheets-Sheet 3

INVENTOR.
Werner G. Seck
BY Richard R. Fitzsimmons
ATTORNEY.

United States Patent Office 2,713,381
Patented July 19, 1955

2,713,381

METHOD OF MAKING FLEXIBLE HOSE

Werner G. Seck, Canton, Ohio, assignor to The Hoover Company, North Canton, Ohio, a corporation of Ohio Application February 6, 1953, Serial No. 335,475

6 Claims. (Cl. 154—8)

The present invention relates to a method of making a flexible hose and more particularly to a flexible hose adapted for use with suction cleaners.

The present application is co-pending with application Serial No. 335,474 filed concurrently herewith, now patent No. 2,695,631.

According to the present invention a strip of an elastomeric thermo-plastic composition is extruded in any manner well known to the art.

The strip is formed of a central comparatively thin section connecting edge sections extending laterally from the central section and adapted to be interlocked with each other as the strip is spirally wound. One of the edge sections is formed with a reentrant groove and the other with a protuberence to be interlocked with the reentrant groove of the first section.

The extruded strip is spirally wound so as to interlock the protuberence of one edge section with the reentrant groove of the other edge section. As the edge sections are interlocked with each other a spiral reenforcing wire is interlocked into the spiral seam formed between the edge sections.

A channel is formed within the protuberence of the edge section into which the reenforcing wire is fed as the strip is spirally wound. A slit is provided in the protuberence extending from the surface of the protuberence into the channel whereby the reenforcing wire may be more readily inserted into the channel.

According to one modification of the present invention the slit is opened and the wire fed into the channel prior to the actual interlocking of the protuberence and reentrant groove with each other.

According to a second modification of the present invention the protuberence is first interlocked within the reentrant groove and thereafter the slit of the protuberence is opened and the wire fed through the slit into the channel of the protuberence to firmly lock the latter within the reentrant groove.

According to both methods of the present invention a flexible hose may be made in continuous lengths and thereafter severed to form the proper lengths for use with suction cleaners or for any other suitable purpose.

Other objects and advantages of the present invention will become apparent as the description proceeds when taken in connection with the accompanying drawings in which.

Figure 1:
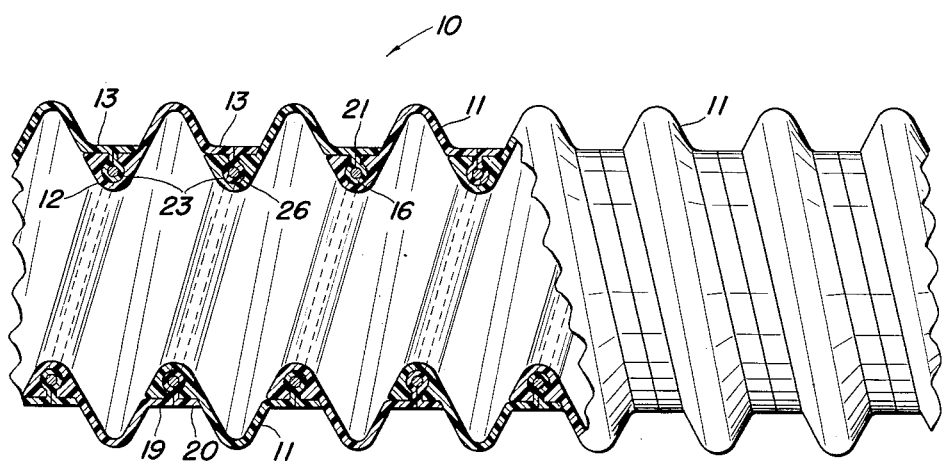
Figure 1 is a view of a flexible hose made according to the present invention, partially in section and showing the construction thereof.
Figure 2:
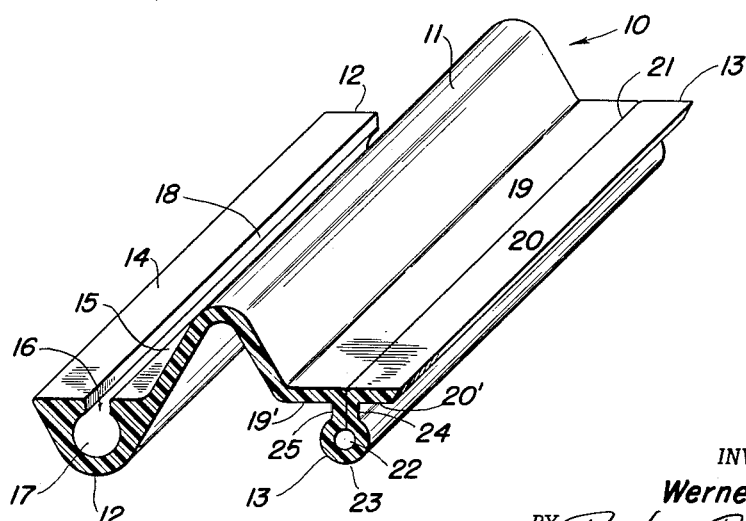
Figure 2 is a perspective view of an extruded strip of an elastomeric thermo-plastic material used in the manufacture of a hose according to the present invention.

The hose of Fig. 1 and the strip of Fig. 2 are claimed in my copending application, above identified. The present application claims the method of forming the hose shown in Fig. 1.

Referring to the drawings and particularly to Fig. 2 thereof, an extruded strip of elastomeric thermo-plastic material from which the main body of the flexible hose of my copending application is made is generally designated by the reference numeral 10.

The strip 10 comprises a central outwardly bulged portion 11 joining edge sections 12 and 13.

The edge section 12 comprises upwardly facing lands 14 and 15 separated by a reentrant groove 16. As shown, the reentrant groove 16, is in the form of a continuous passage 17 and a narrower neck or slot 18 opening to the upper surface of the edge 12 between the lands 14 and 15.

The edge section 13 comprises lands 19 and 20 separated by a slit 21 which extends downwardly to a continuous channel 22 in an interlocking protuberence 23. The outside diameter of protuberence 23 is substantially the same as the inside diameter of passage 17 and the thickness of the walls 24 and 25 is substantially the same as the width of the slot 18. On either side of the walls 24 and 25 are downwardly facing lands 19' and 20' adapted to mate with the lands 14 and 15 of the edge section 12 as the hose is formed.

Referring to Fig. 1, the hose of my copending application comprises the spirally wound elastomeric thermoplastic strip 10 having a relatively thin outwardly bulged section 11 connecting edge sections 12 and 13 and with the protuberance 23 interlocked within the reentrant groove 16 by means of a reenforcing wire 26.

It is to be understood that it is within the purview of the present invention that the protuberance 23 extend laterally from the edge section 13 and that the reentrant groove 16 open laterally from the section 12 and that the protuberance 23 be interlocked within the reentrant groove 16 laterally of the strip 10 rather than vertically as shown. It is preferable however, that those parts be interlocked as shown since the method of assembly is simpler in that case.

Figure 4:
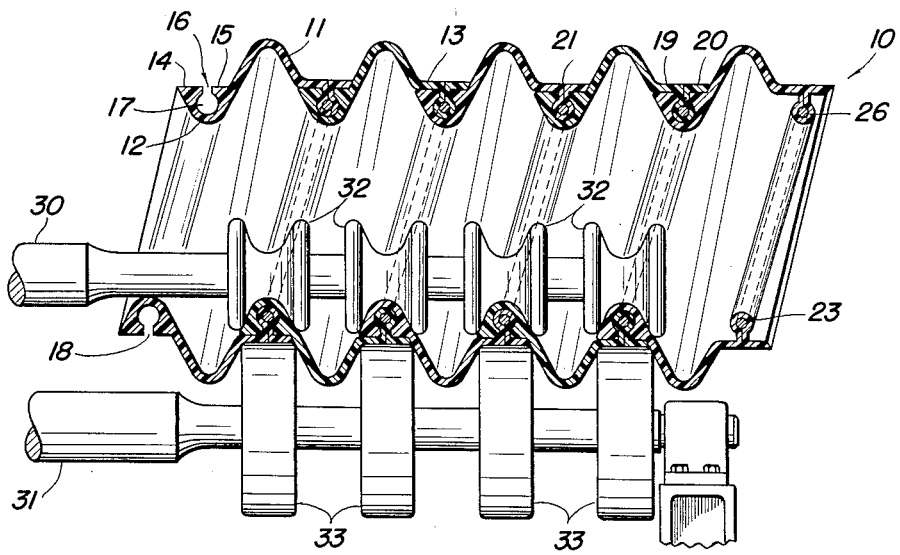
Figure 4 is another view of the apparatus of the modification of Fig. 3 showing how the spiral strip and reenforcing wire are interlocked together according to the present invention.
Figure 3:
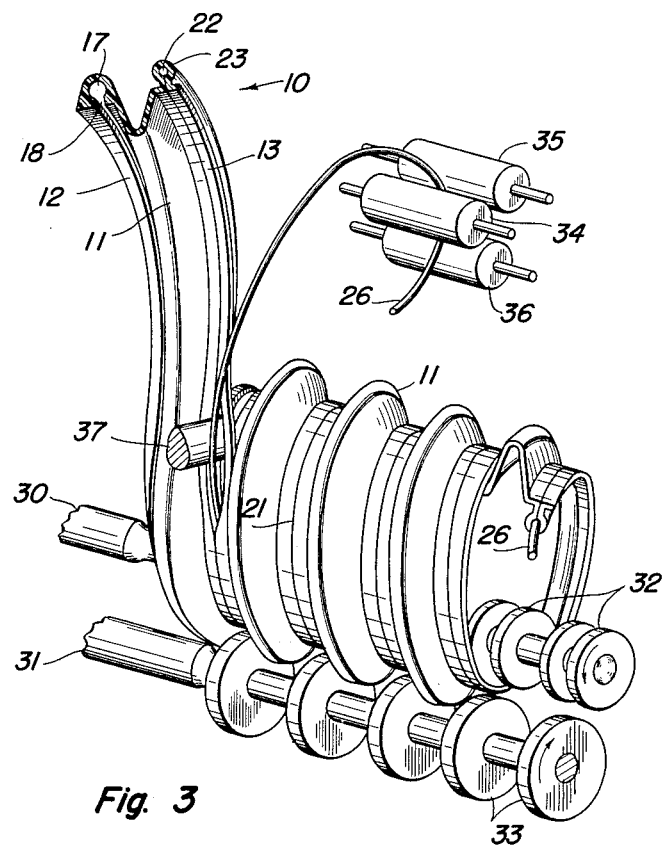
Figure 3 shows one form of an apparatus by which the method of the present invention may be carried out.

One method and apparatus for assembling the hose according to the present invention is shown in Figs. 3 and 4 of the drawings.

Broadly, the hose is assembled according to the present invention in the following manner.

The strip 10 is extruded from an elastomeric thermoplastic material in a manner well known in the art. The strip 10 may be led directly from the extruder or from a reel and is spirally wound to mate the edge sections 12 and 13 with each other, the protuberance 23 of edge section 13 being interlocked with the reentrant groove 16 of the edge section 12 with the bulged section 11 extending outwardly and the lands 14 and 15 of edge section 12 mating with the lands 19' and 20' of edge section 13. As the strip 10 is spirally wound the slit 21 is opened and the spiral wire 26 inserted into the channel 22. The strip 10 being flexible the wire 26 may be inserted into the channel 22 through the slit 21 either before or after the edge sections 12 and 13 are interlocked with each other.

If desired the lands 14, 15, 19' and 20', the outer surfaces of protuberance 23, walls 24 and 25, inner surfaces of duct 17 and groove 18 and the wire 26 may be coated with any suitable adhesive to assure that all parts will be firmly interlocked with each other.

By the apparatus shown in Figs. 3 and 4, the wire 26 is inserted into the channel 22 through the slit 21 before the edge sections 12 and 13 are interlocked with each other.

As shown in Figs. 3 and 4, one apparatus for assembling the hose according to the present invention comprises counter rotating shafts 30 and 31 which rotate in the direction shown by their respective arrows. The shaft 30 carries a plurality of rollers 32 grooved to fit the contour of the inner side of the edge section 12 of strip 10, while the shaft 31 carries flat surfaced rollers 33 for engagement with the lands 19 and 20 of edge section 13. The wire 26 is prestressed so as to form a spiral coil by rollers 34, 35 and 36. The shafts 30 and 31 and the rollers 34, 35 and 36 are preferably driven by a common source of power at the proper speeds depending upon the respective diameters of the rollers 32 and 33 and of the rollers 34, 35 and 36.

The rollers 32 and 33 advance the strip 10 from the extruding machine or from a reel while the rollers 34, 35 and 36 advance the wire 26 as it is prestressed to form a spiral coil. A plow 37 opens the slit 21 as the strip 10 and wire 26 are advanced so that the wire 26 is led into the channel 22 through slit 21 just before the rollers 32 and 33 force the protuberance 23 into the passage 17 through the slot 18. The strip 10 being flexible the walls of the slot 18 will spread apart to permit the protuberance 23 with wire 26 in channel 22 to enter the passage 17 and thus interlock the edge sections 12 and 13 together. If a cement or adhesive is applied to the parts as previously mentioned, the rollers 32 and 33 will press the parts firmly together and adhere them together to assure a firmly interlocked spiral joint between the edge sections 12 and 13 and the wire 26.

Figure 5:
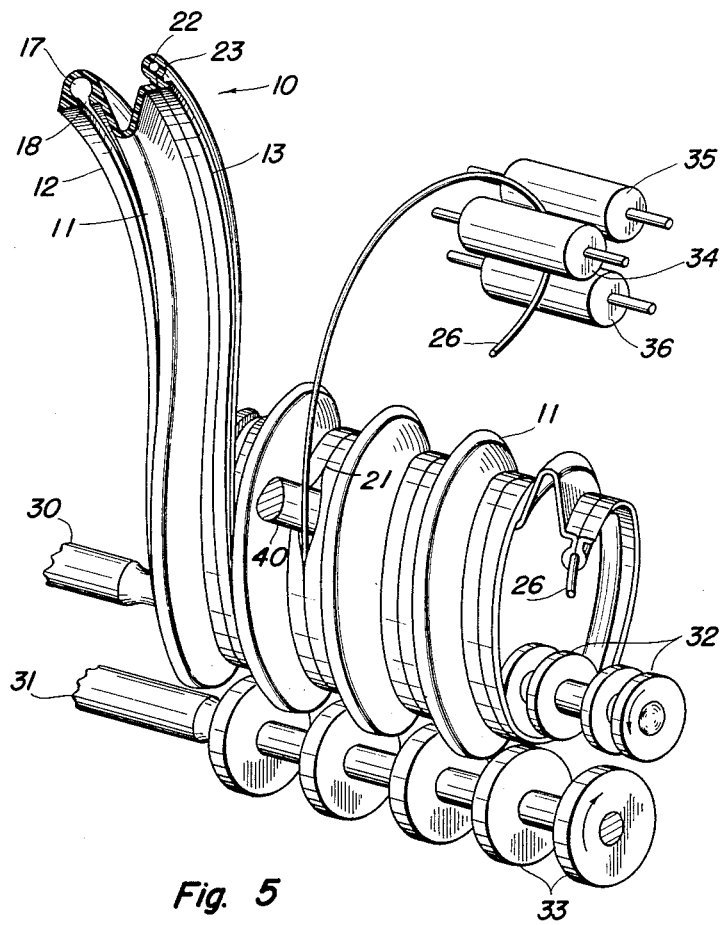
Figure 5 is a view similar to Fig. 3 showing another form of apparatus by which the method of the present invention may be carried out.

The apparatus shown in Fig. 5 of the drawings is similar to that of the modification of Figs. 3 and 4 and where the parts are the same they have been given the same reference numerals.

The only substantial difference between the two modifications is that the plow 37 of the modification of Figs. 3 and 4 has been omitted and the plow 40 substituted therefor. The operation of the two apparatuses is substantially the same except for the fact that in the modification of Fig. 5 the wire 26 is inserted through slit 21 into channel 22 after the protuberance 23 is interlocked with the reentrant groove 16, rather than before as in the modification of Figs. 3 and 4.

In the modification of Fig. 5, the rollers 32 and 33 advance the strip 10 and first forces the protuberance 23 into the passage 17 through the slot 18. The strip 19 being flexible the walls of the edge section 12 will spread apart at the groove 18 and permit the protuberance 23 of edge section 13 to enter channel 17. After the edge sections 12 and 13 are interlocked as just described, the plow 40 will separate the walls of the edge section 13 at the slit 21 and the rollers 34, 35 and 36 will feed the wire 26 into the channel 22 through the opened slit 21 and thus permanently lock the edge sections 12 and 13 together at their spiral seam.

From the foregoing it can be seen that the present invention provides a method of making a very flexible hose formed of a single strip of an extruded elastomeric thermo-plastic material and a reenforcing wire spirally wound together at the mating edges of the strip with the wire serving to interlock the edges of the strip together and also serving as a reenforcement to prevent the collapse of the hose.

While I have shown and described but two embodiments of my invention it is to be understood that those embodiments are to be taken as illustrative only and not in a limiting sense. I do not wish to be limited to the particular method shown and described but wish to include all equivalent variations thereof except as limited by the scope of the claims.

I claim:

1. The method of making a flexible hose from a strip of elastomeric thermo-plastic material having a central flexible outwardly bowed section and laterally extending edge sections, one of said laterally extending sections being formed with a longitudinally extending groove having overhanging shoulders, the other of said laterally extending sections being formed with a longitudinally extending shoulder rib shaped to interlock with said overhanging shoulder and with a longitudinally extending recess formed in said rib, that improvement which comprises the steps of spirally winding said strip into a tubular formation, interlocking said edge sections to each other to form a spiral seam between them and feeding a spirally wound reenforcing wire into said recess to interlock them to each other.

2. The method of making a flexible hose according to claim 1 in which said reenforcing wire is embedded within said recess after said edge sections are interlocked with each other.

3. The method of making a flexible hose according to claim 1 in which said reenforcing wire is embedded within said recess prior to the interlocking of said edge sections into a spiral seam.

4. The method of making a flexible hose from a strip of elastomeric thermo-plastic material having a central section and laterally extending sections in which one of said edge sections is formed with a reentrant groove and the other edge section is formed with a protuberance for interlocking engagement with said reentrant groove and in which the other of said edge sections is formed with an interior channel, comprising spirally winding said strip into a tubular formation while interlocking the protuberance and reentrant groove of the edge sections with each other to form a spiral seam between them and simultaneously feeding a spirally wound reenforcing wire into said interior channel to lock the spiral seam.

5. The method of making a flexible hose according to claim 4 in which said spirally wound reenforcing wire is fed into said interior channel before said reentrant groove and protuberance are interlocked with each other.

6. The method of making a flexible hose according to claim 4 in which said spirally wound reenforcing wire is fed into said interior channel after said reentrant groove and protuberance are interlocked with each other.

References Cited in the file of this patent

UNITED STATES PATENTS

| | | |
|---|---|---|
| 2,337,373 | Chernack | Dec. 21, 1943 |
| 2,486,387 | Bringolf | Nov. 1, 1949 |
| 2,516,864 | Gilmore et al. | Aug. 1, 1950 |
| 2,539,853 | Meyers et al. | Jan. 30, 1951 |